(12) United States Patent
De Cuyper et al.

(10) Patent No.: US 8,282,174 B2
(45) Date of Patent: Oct. 9, 2012

(54) CORNER STRUCTURE FOR ELECTRICAL ENCLOSURE

(75) Inventors: Johan De Cuyper, Oost Vlaanderen (BE); Rafal Burzynski, Slaskie (PL); Tomasz Tomanek, Piekary Slaskie (PL)

(73) Assignee: General Electric Company, Schenectady, NY (US)

( * ) Notice: Subject to any disclaimer, the term of this patent is extended or adjusted under 35 U.S.C. 154(b) by 486 days.

(21) Appl. No.: 12/425,848

(22) Filed: Apr. 17, 2009

(65) Prior Publication Data

US 2010/0264785 A1    Oct. 21, 2010

(51) Int. Cl.
*A47G 29/00*    (2006.01)

(52) U.S. Cl. .................................. 312/263; 312/265.5

(58) Field of Classification Search .................. 312/263, 312/265.2–265.5, 108, 111, 265; 403/205, 403/403, 231
See application file for complete search history.

(56) References Cited

U.S. PATENT DOCUMENTS

| | | | | |
|---|---|---|---|---|
| 5,695,263 A * | 12/1997 | Simon et al. | ............... | 312/265.4 |
| 5,820,289 A * | 10/1998 | Kern et al. | .................... | 403/231 |
| 6,036,290 A * | 3/2000 | Jancsek et al. | ............. | 312/265.4 |
| 6,299,268 B1 * | 10/2001 | Carle et al. | .................. | 312/265.4 |
| 6,516,955 B1 * | 2/2003 | Dudhwala et al. | ............... | 211/26 |
| 6,575,657 B1 * | 6/2003 | Reuter et al. | ................... | 403/231 |
| 6,712,434 B2 * | 3/2004 | Knab et al. | .................. | 312/265.4 |
| 6,962,262 B2 | 11/2005 | Toma | | |
| 7,715,198 B2 * | 5/2010 | Mori et al. | ..................... | 361/724 |
| 7,896,177 B1 * | 3/2011 | Toma | ............................. | 211/182 |
| 2003/0062326 A1 * | 4/2003 | Guebre-Tsadik | ............... | 211/26 |
| 2004/0183409 A1 * | 9/2004 | Rinderer | ..................... | 312/265.4 |
| 2007/0257585 A1 * | 11/2007 | Kenny et al. | ............... | 312/265.4 |

FOREIGN PATENT DOCUMENTS

| | | | |
|---|---|---|---|
| EP | 316821 | A2 | 5/1989 |
| EP | 810701 | A1 | 12/1997 |
| EP | 935324 | A1 | 8/1999 |
| FR | 2841055 | A1 | 12/2003 |

* cited by examiner

*Primary Examiner* — Hanh V Tran
(74) *Attorney, Agent, or Firm* — Global Patent Operation; Stephen G. Midgley

(57) ABSTRACT

A post member for securing a plurality of enclosure panels together. The post member includes a first end having at least one fixation hole configured to engage an alignment member of a first one of the enclosure panels, and a centering pin configured to engage the first one of the enclosure panels. The post member also includes a second end having at least one aperture configured for engagement with at least one other of the enclosure panels.

22 Claims, 16 Drawing Sheets

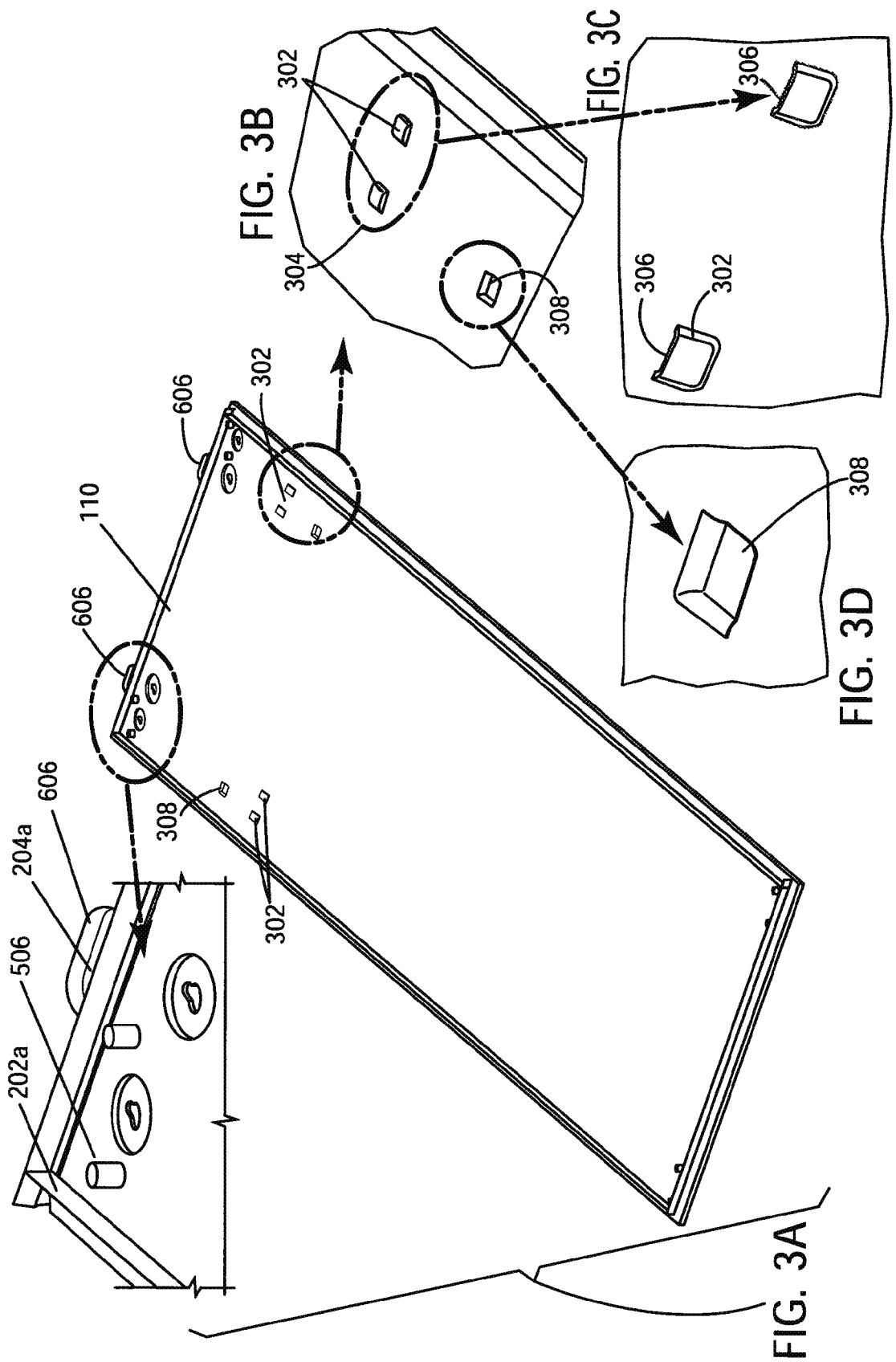

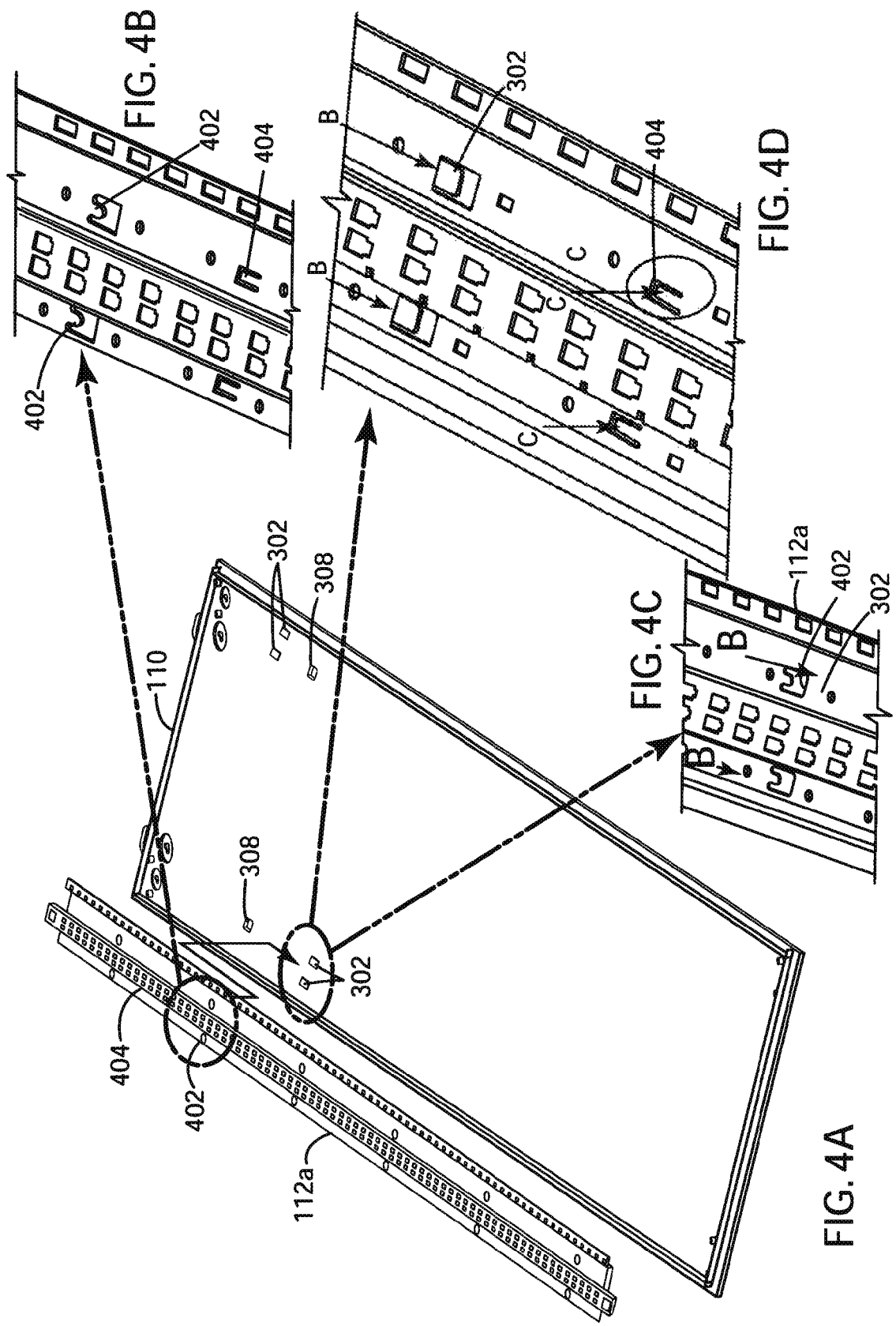

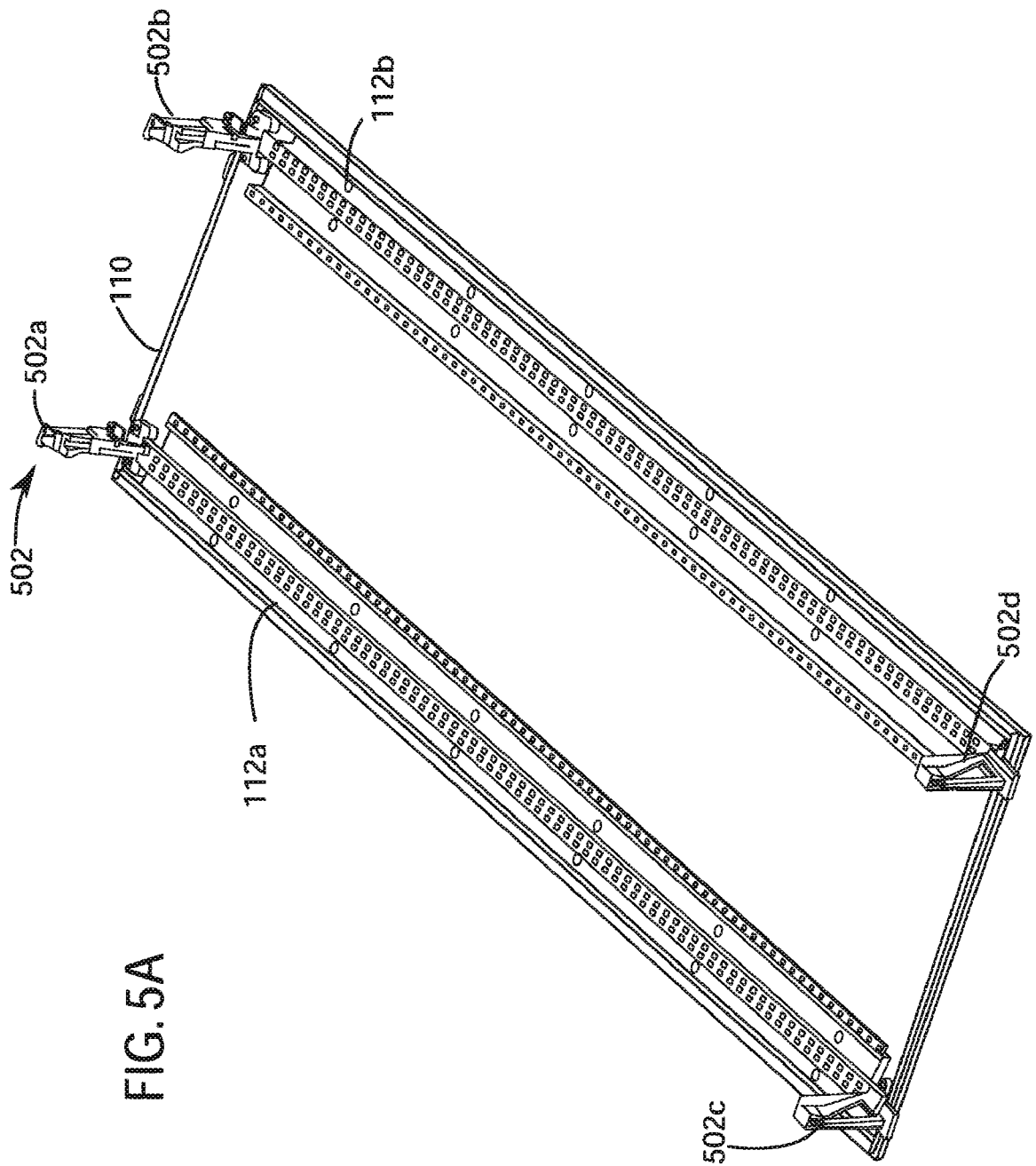

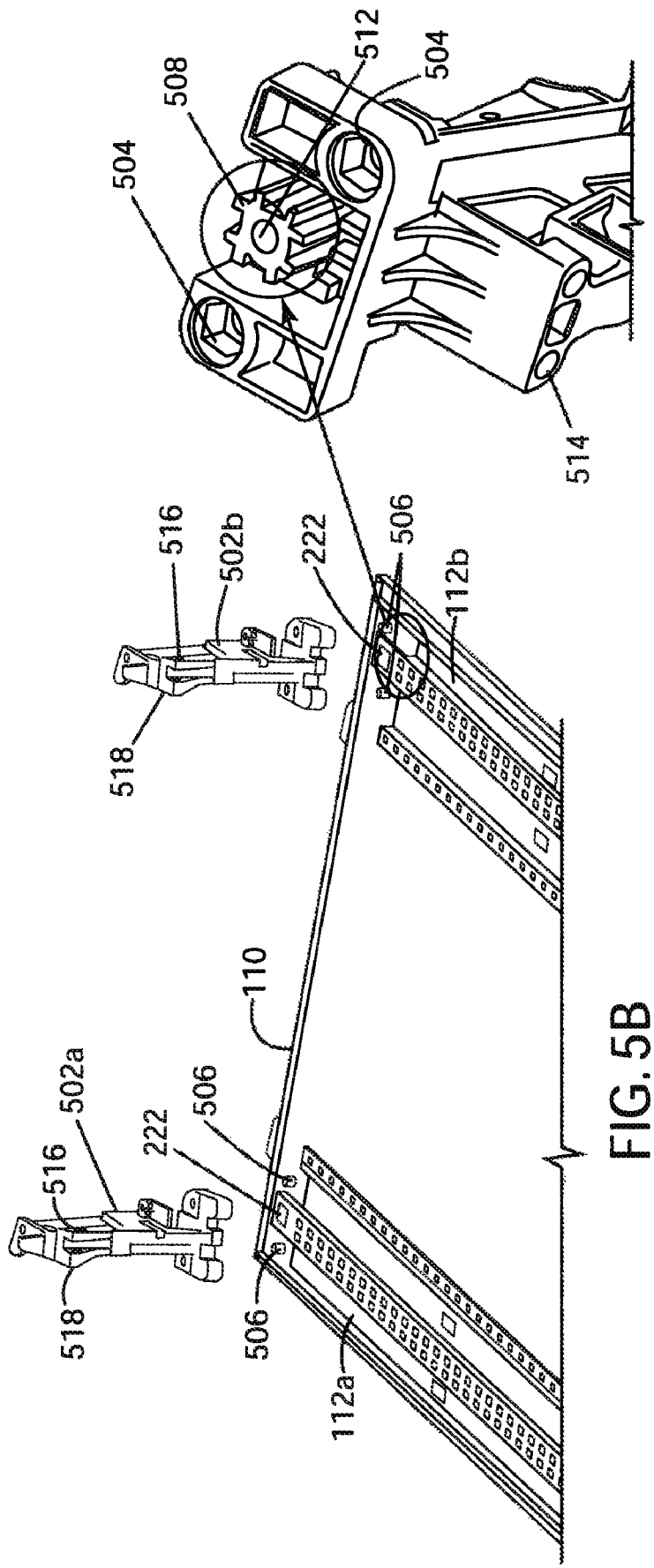

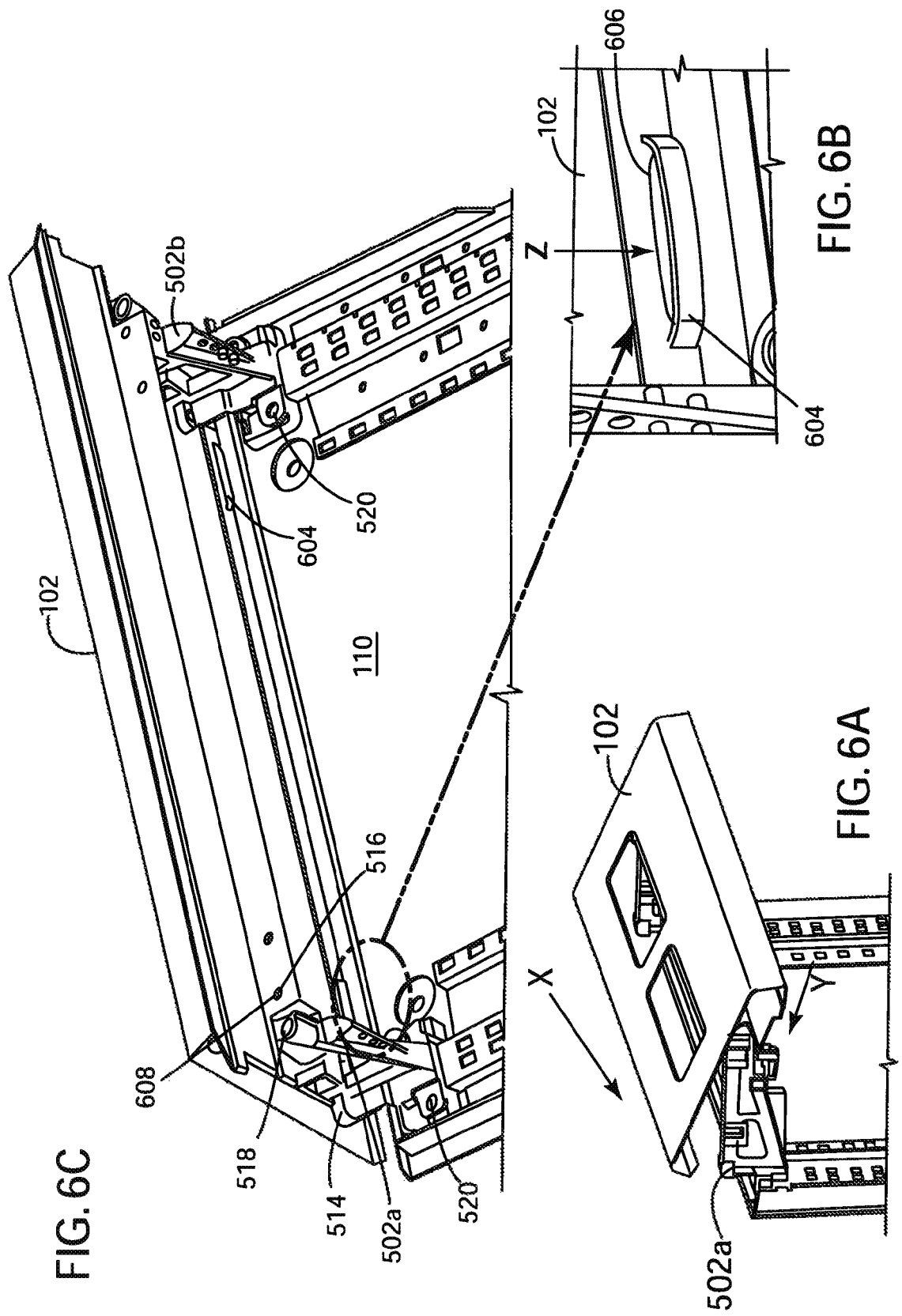

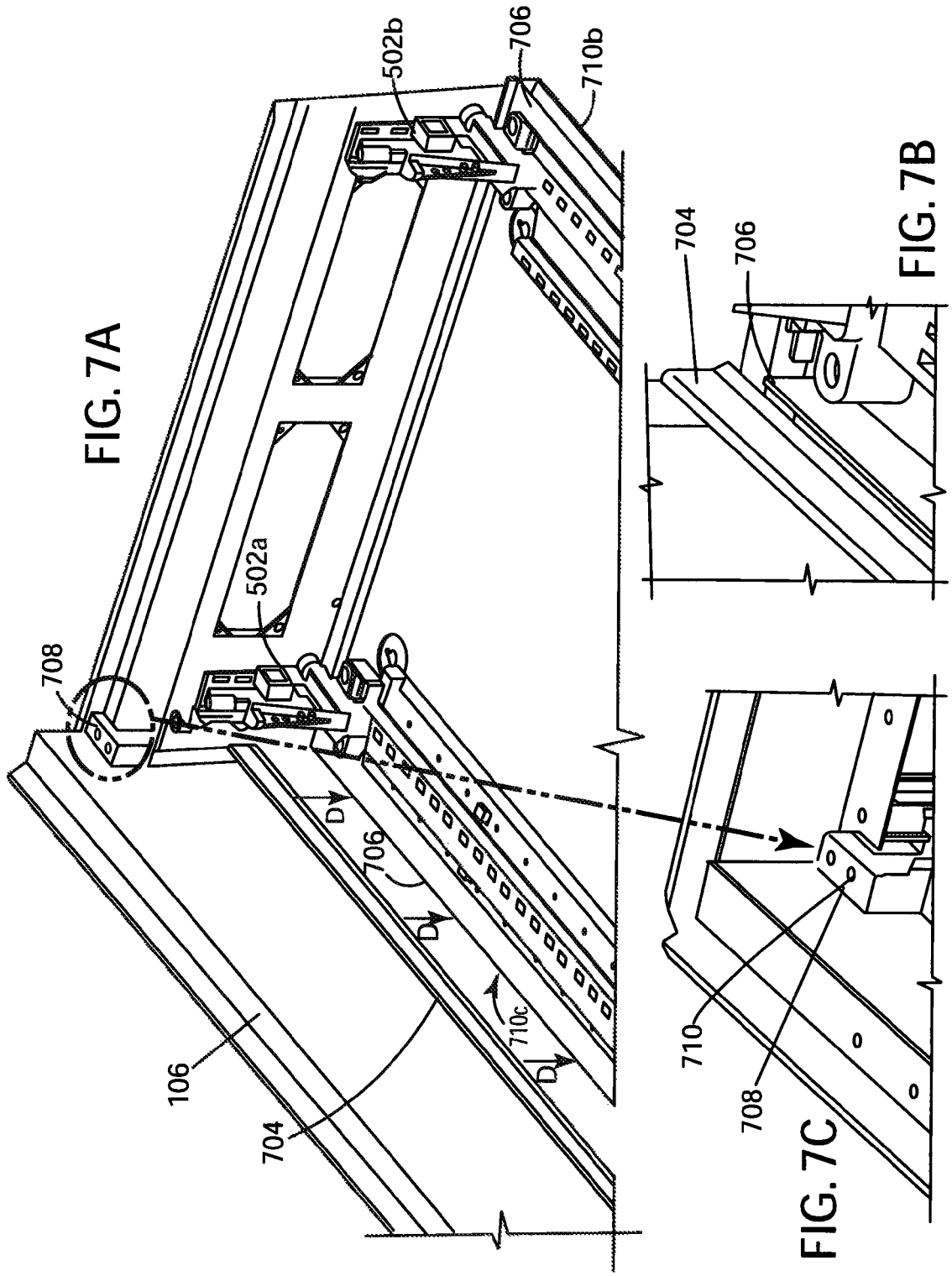

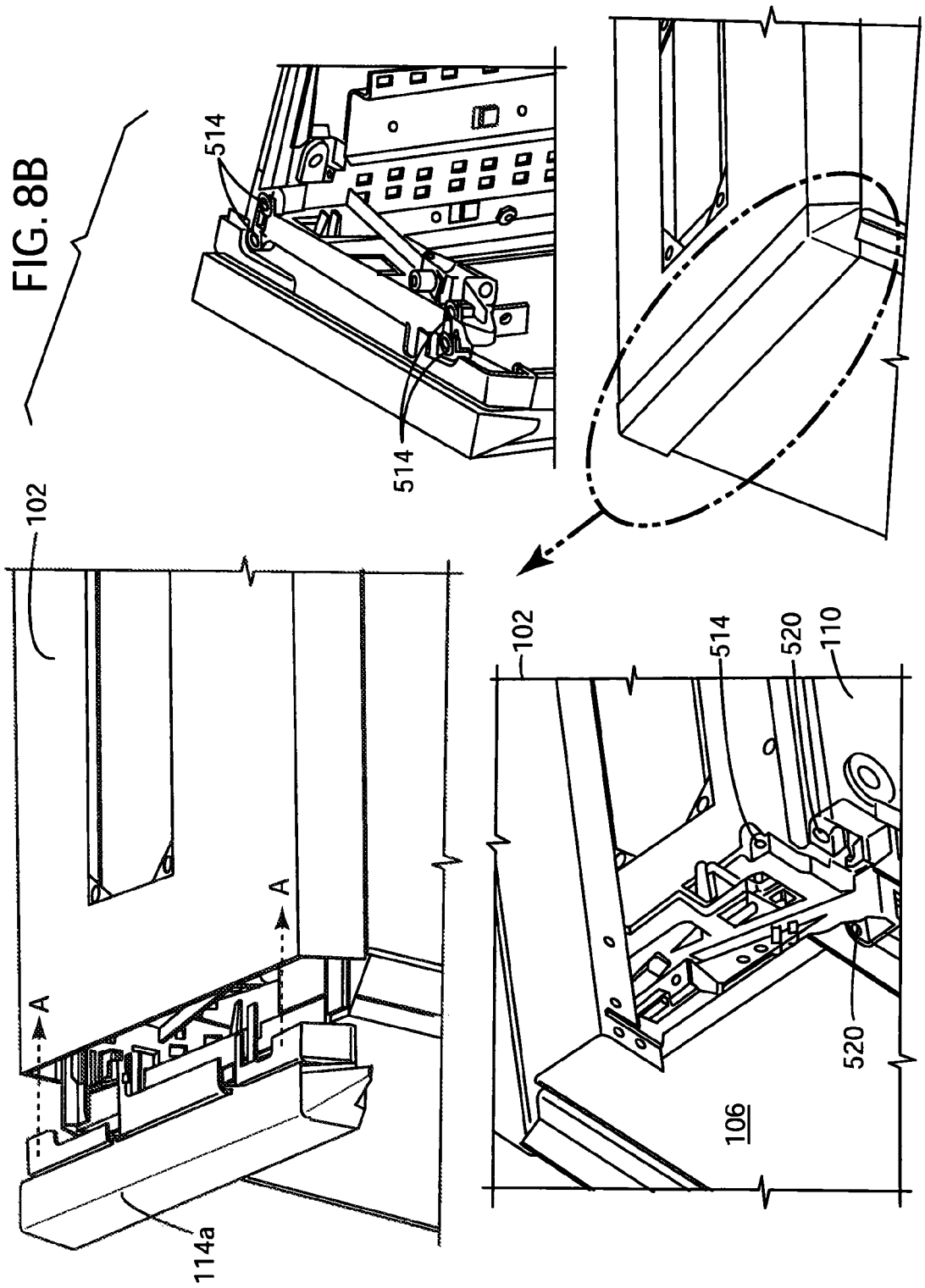

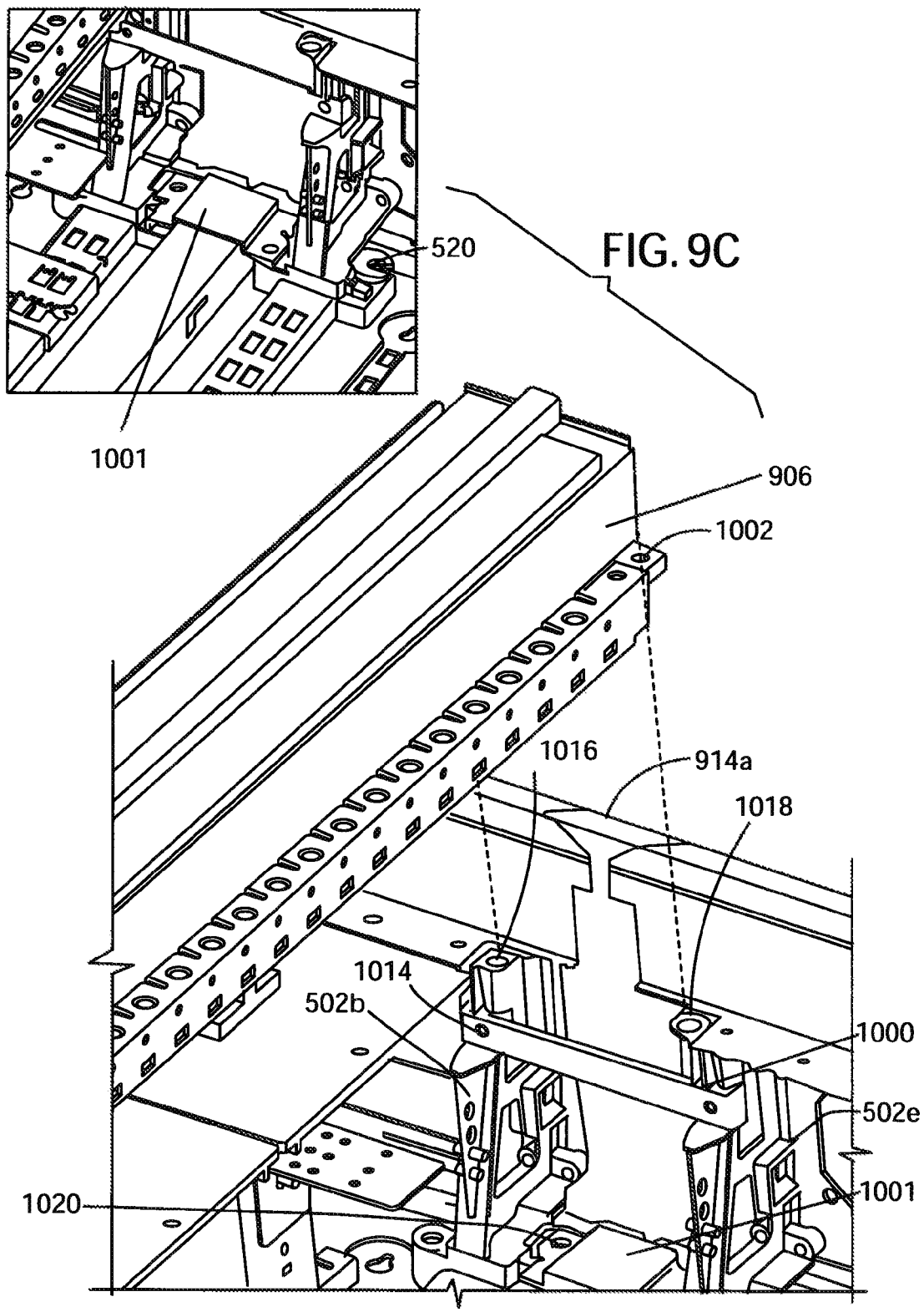

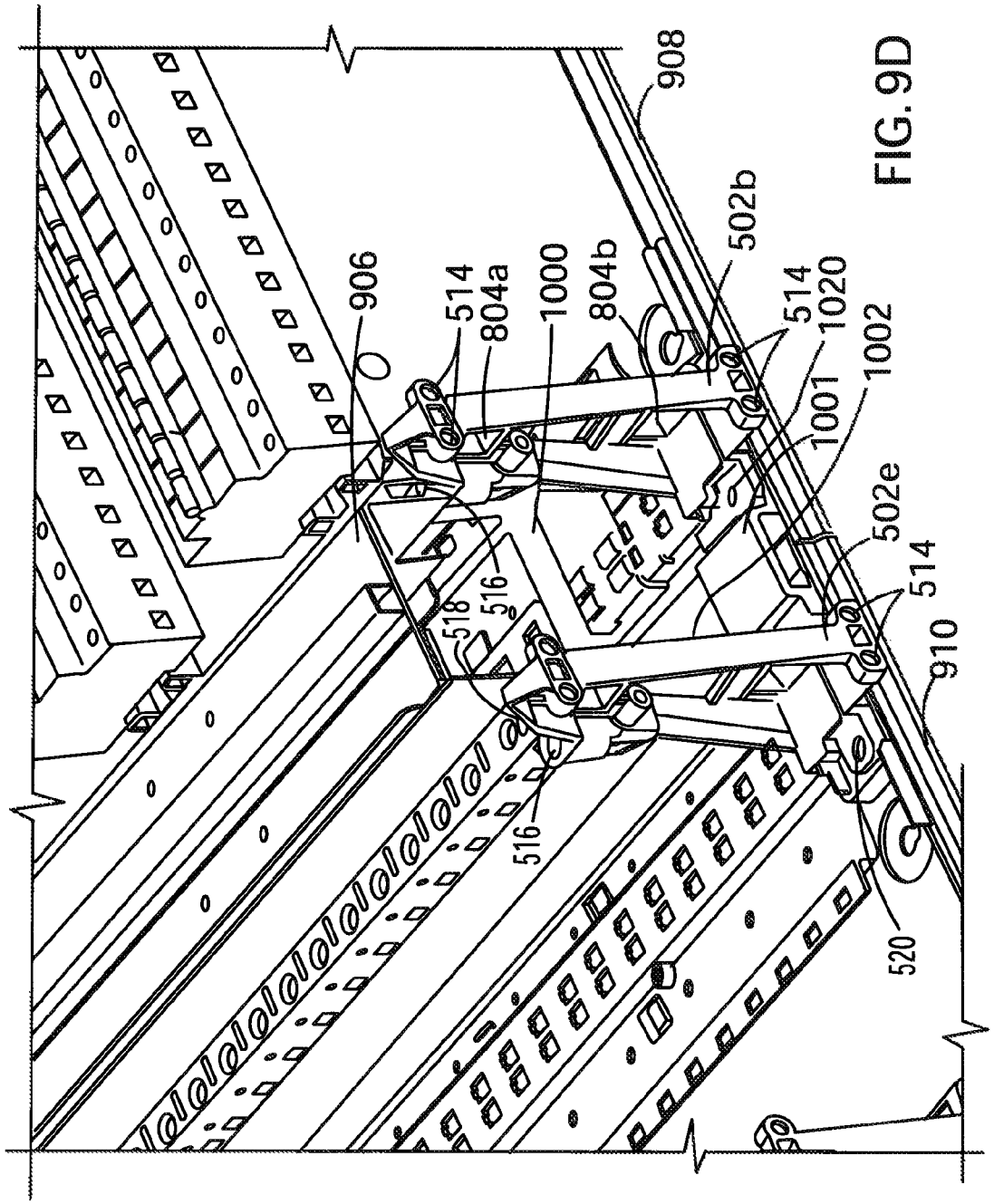

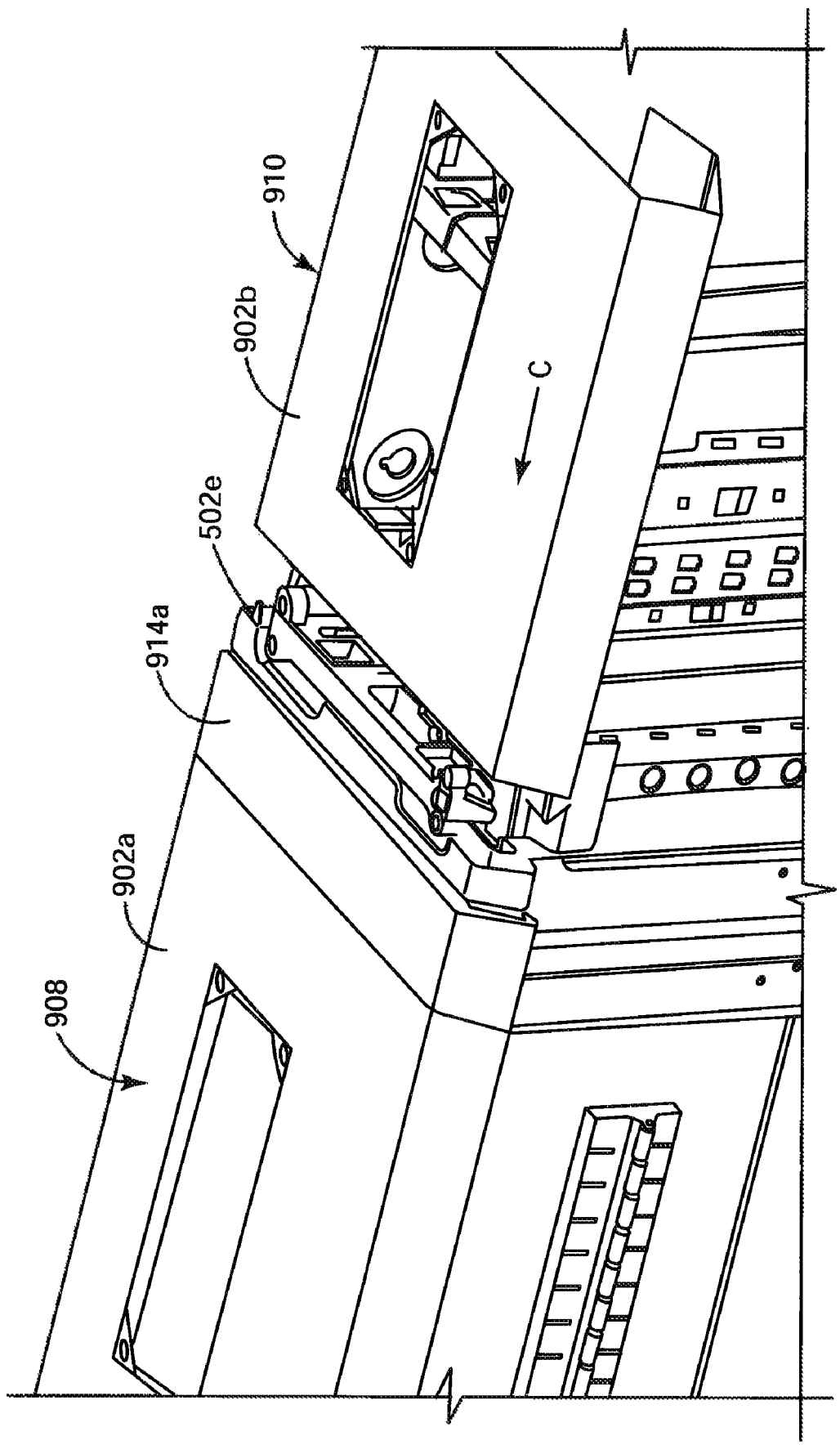

CORNER STRUCTURE FOR ELECTRICAL ENCLOSURE

BACKGROUND OF THE INVENTION

The exemplary embodiments of the present invention generally relate to equipment rack enclosures, and more particularly to a corner structure of an enclosure for electrical equipment.

Equipment enclosures and equipment rack enclosures for housing equipment, such as electronic and electrical equipment, are generally known. Some of these enclosures are constructed by assembling rigid frame members that are joined by corner blocks and fastened together. The enclosures can be provided in an assembled or kit form. It is desirable to be able to assemble an enclosure for electronic equipment in a simplified manner, without the need for special tools or hardware. It is also desirable to be able to expand a size of an enclosure in a straightforward manner without the need for a number of different parts.

BRIEF DESCRIPTION OF THE INVENTION

As described herein, the exemplary embodiments overcome one or more of the above or other disadvantages known in the art.

One aspect of the exemplary embodiments relates to a post member for securing a plurality of enclosure panels together. The post member includes a first end having at least one fixation hole configured to engage an alignment member of a first one of the enclosure panels, and a centering pin configured to engage the first one of the enclosure panels. The post member also includes a second end having at least one aperture configured for engagement with at least one other of the enclosure panels.

Another aspect of the exemplary embodiments relates to a corner structure for an enclosure having top, bottom and side panels, and a back panel with at least one rack rail member positioned thereon. The corner structure includes a post member, a first end of the post member including at least one fixation hole, the at least one fixation hole configured to engage a respective alignment member located in a corner region of the back panel of the enclosure, and a centering pin on the first end of the post member, the centering pin member being configured to engage the rack rail member to secure the rack rail member to the back panel. A second end of the post member includes at least a pair of apertures, each aperture configured to secure the top or bottom panel and a corresponding side panel to the second end of the post member.

Still another aspect of the exemplary embodiments relates to an enclosure for electrical equipment. In one embodiment, the enclosure includes a back panel, top and bottom panels, and a pair of side panels. At least one rack rail member is affixed to the back panel. A post member is located in each corner of the enclosure, the post member configured to secure the back panel, top or bottom panel, and a respective side panel together. Each post member includes a centering pin at a first end of the post member that is configured to engage the rack rail member to secure the rack rail member to the back panel. The second end of the post member includes a pair of holes, each hole configured to secure the top or bottom panel and a corresponding side panel to the post member.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

BRIEF DESCRIPTION OF THE DRAWINGS

In the drawings:

FIGS. 3A-3D is a perspective view of one embodiment of the back panel shown in FIG. 2;

FIGS. 4A-4D a schematic view of the assembly of a rack rail system to the back panel of FIG. 2 in accordance with the aspects of the disclosed embodiments;

FIGS. 5A-5C are schematic views of the corner post member of the disclosed embodiments;

FIGS. 6A-6C illustrate an exemplary assembly of the top panel to the back panel and corner post members;

FIGS. 7A-7C illustrate an exemplary assembly of the side panels to the back panel and corner post members;

FIGS. 8A-8B illustrate an exemplary installation of a corner member of the enclosure of the disclosed embodiments;

FIGS. 9A-9E illustrate multiple enclosures coupled together.

DETAILED DESCRIPTION OF THE INVENTION

Figure 1:
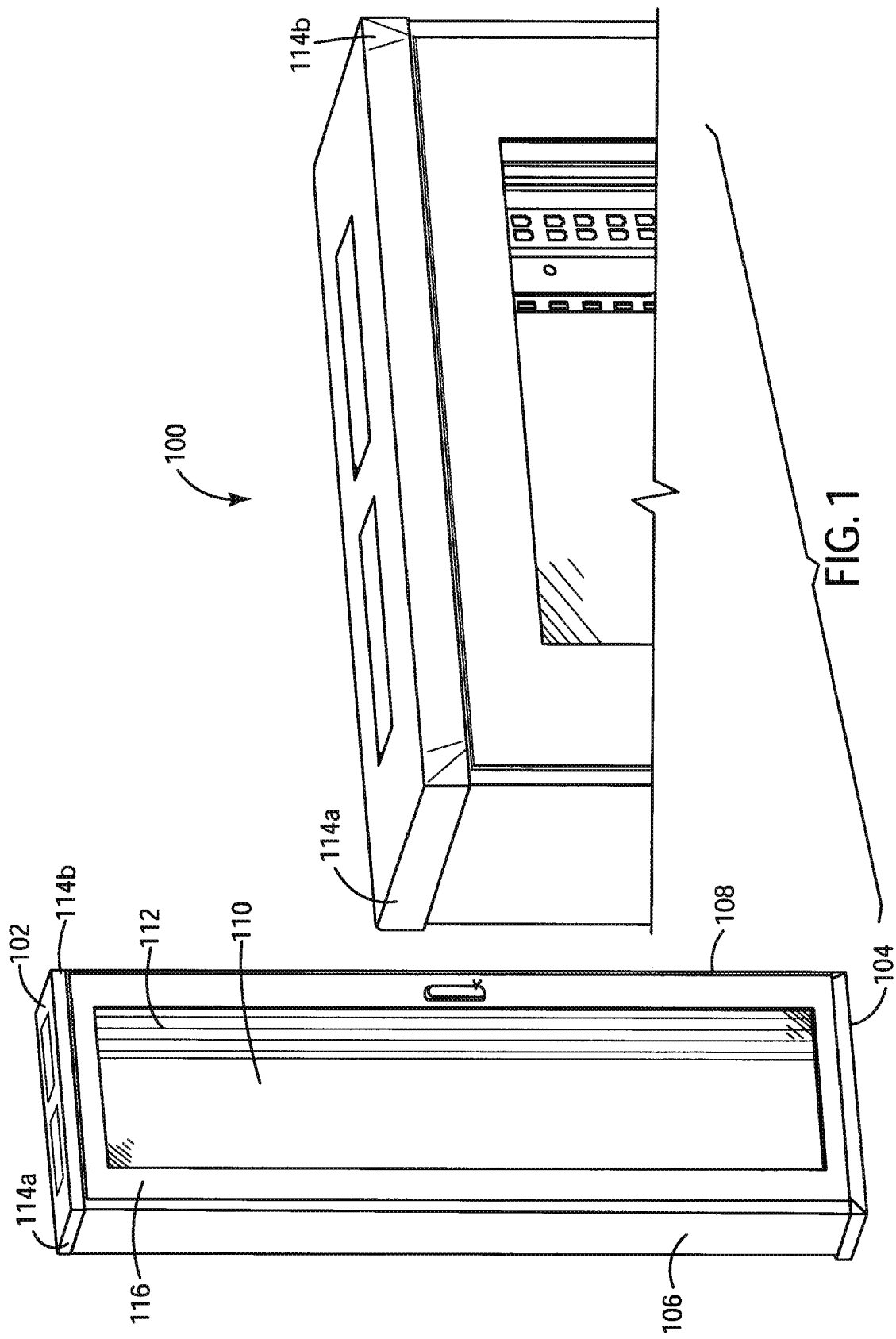
FIG. 1 is a perspective view of an enclosure incorporating aspects of the disclosed embodiments.

Referring to FIG. 1, one embodiment of an enclosure 100 incorporating aspects of the claimed subject matter is illustrated. The exemplary embodiments described herein will generally be with respect to an enclosure for electrical equipment, including, for example, circuit breakers, residual current devices (RCD's), and switches. In alternate embodiments, the enclosure can be for any suitable equipment, other than including electrical equipment. For example, in one embodiment, the enclosure is an enclosure for rack mountable equipment.

The exemplary enclosure 100 shown in FIG. 1 generally includes a top panel 102, bottom panel 104, side panels 106, 108, back plate or back panel 110 and corner parts 114a, 114b. In one embodiment, the enclosure 100 can include a door 116. One or more rack rail member 112, shown within the interior of the enclosure 100, is attached to the back panel 110. In alternate embodiments then enclosure 100 can include other suitable components for assembling an electrical equipment enclosure.

Figure 2:
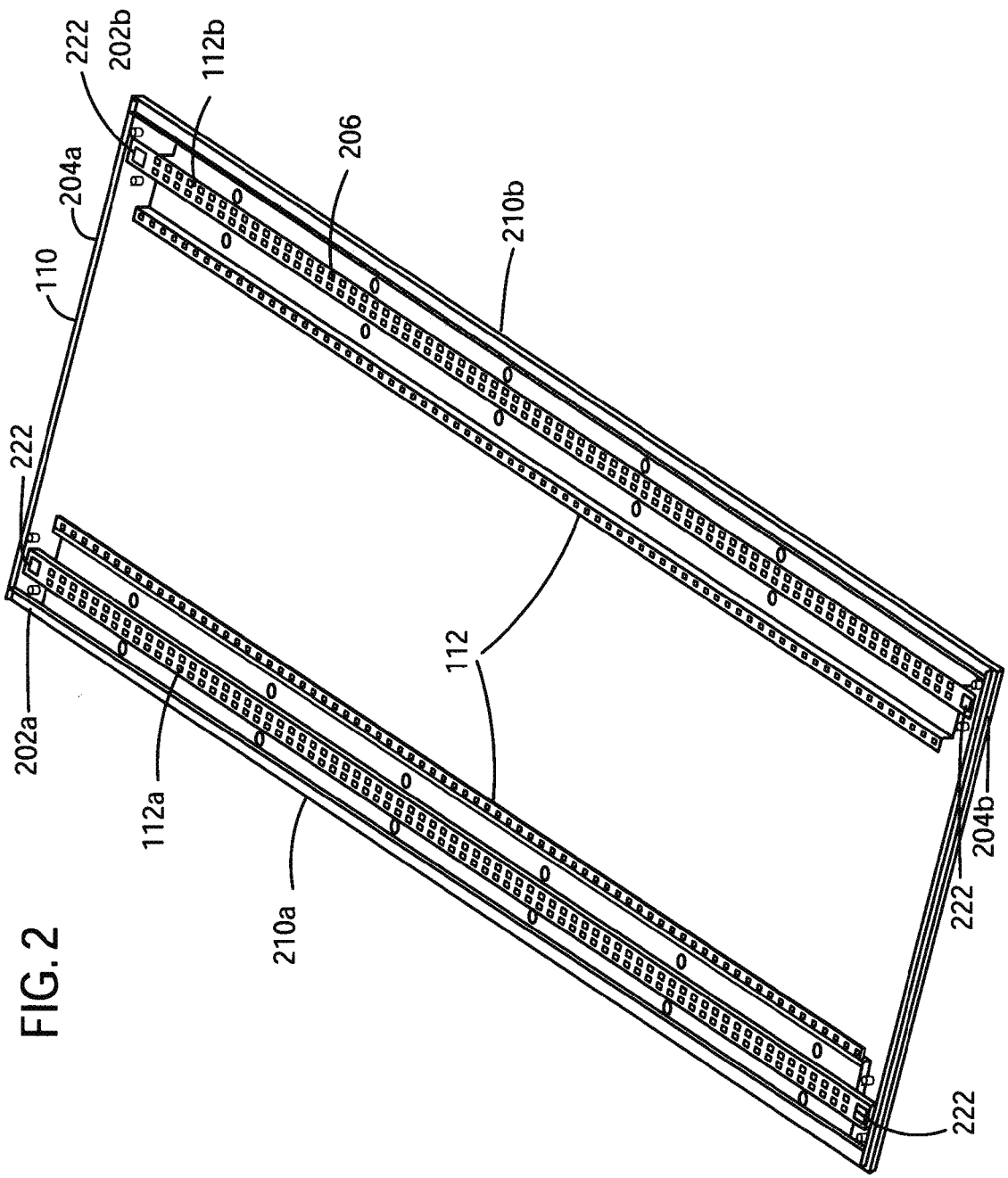
FIG. 2 is a perspective view of one embodiment of a back panel for the enclosure of FIG. 1 having a rack rail system affixed thereto.

Referring to FIG. 2, one embodiment of a back panel 110 for the enclosure 100 having one or more rack rail members 112a, 112b positioned thereon is illustrated. As shown in FIG. 2, the back panel 110 generally comprises upstanding rib members 202a, 202b along each lateral side 210a, 210b of the back panel 110. A grooved member 204a, 204b is formed along each of the top and bottom edges of the back panel 110.

The rack rail members 112a, 112b are configured to be securely affixed to the back panel 110, and will generally conform to certain industry standard specifications for mounting equipment, such as electrical equipment. Each rack rail member 112a, 112b generally includes a repeating, predetermined pattern of openings 206 that complies with industry standard requirements for standard rack rails and securing equipment and rack shelves, for example. Each rack rail member 112a, 112b also includes an opening 222 at its top and bottom.

Referring to FIGS. 3A-3D, in one embodiment, the back panel 110 includes a plurality of pocket punches 302 along each lateral side of the back panel 110. Generally, the pocket punches 302 are formed in pairs 304 (FIG. 3B) and are equally spaced along the lateral sides of the back panel 110 to conform to the pattern of openings 206 of each rack rail member 112a, 112b. Each pocket punch 302 includes a slot 306 as shown in FIG. 3C. The back panel 110 also includes one or more punches 308 as shown in FIG. 3D, where each punch 308 creates a recess into the back panel 110.

Referring to FIGS. 4A-4D, each rack rail member 112a, 112b is configured to be affixed to the back panel 110 by slidingly engaging a rib member 402 of a rack rail 112 into a corresponding pocket punch 302. For purposes of illustration herein, only one rack rail member 112a is shown in FIG. 4A. Each rib 402 is configured to slidingly engage a slot 306 in a corresponding pocket punch 302. As shown in FIGS. 4C and 4D, in one embodiment, the rack rail member 112a can be moved in the direction B, as indicated by the arrows, to slidingly engage each rib 402 in the corresponding slot 306.

In one embodiment, the rack rail member 112a also includes a plurality of bendable ribs 404, shown in FIGS. 4A and 4B. The bendable ribs 404 are generally configured to prevent the rack rail 112a from moving in a direction that will cause the ribs 402 to be disengaged from their respective slots 306 after the ribs engage the slots 306. Each bendable rib 404 is configured to be moved or bent in a direction C to engage a corresponding punch recess 308 in the back panel 110. In one embodiment, as shown for example in FIG. 4D, after the ribs 402 engage the slots 306, the bendable rib 404 is pushed into the punch recess 308 in order to at least temporarily secure a position of the rail rack 112a on the back panel 110.

Referring to FIG. 5A, the aspects of the disclosed embodiments include a post member 502. In one embodiment, the post member 502 is used to secure the back panel 110, side panels 106, 108 and top/bottom panels 102, 104 (FIG. 1) together in each corner of the enclosure 100. Each post member 502a-502d can also be configured to position and retain the respective rail rack members 112a, 112b on the back panel 110.

As shown in FIG. 5A, in one embodiment, a post member 502a-502d is positioned in each corner region of the back panel 110. For purposes of illustration, only the post member 502a will be described herein. However, the aspects of the disclosed embodiments apply equally to the other post members 502b-502d. In one embodiment, the post member 502 generally comprises a conductive material, such as for example, a cast aluminum alloy. In alternate embodiments, the post member 502 can comprise any suitable material.

As shown in FIG. 5B, one end of the post member 502a is configured to engage the back panel 110 and rack rail member 112a, while the other end extends in a substantially perpendicular orientation from the back panel 110. For positioning the post member 502a, the post member 502a includes a pair of central fixation holes 504. Each fixation hole 504 is configured to engage a corresponding alignment member 506 on the back panel 110 as shown in FIG. 5B. In one embodiment, the back panel 110 includes one or more alignment members or pillars 506 in each corner region of the back panel 110. As shown in FIG. 5B, in one embodiment, the alignment members 506 are cylindrical in shape, forming an upstanding pillar. However, in alternate embodiments, the alignment members 506 can comprise any suitable size, shape and number.

The post member 502a also includes a centering pin 508 that is configured to allow the post member 502a to be secured to the back panel 110. In one embodiment, each end of the rack rail 112a includes a correspondingly shaped opening 222 that is configured to receive the centering pin 508. Although the opening 222 is shown as part of the rack rail 112a, in alternate embodiments any suitable structure can be provided that includes an opening 222 for securing the rack rail member 112a to the back panel 110. As shown in FIGS. 5B and 5C, in one embodiment, both the centering pin 508 and the opening 222 in the rack rail 112a are substantially rectangular in shape. In alternate embodiments, the centering pin 508 and opening 222 can comprise any suitable size, shape and configuration.

In one embodiment, the centering pin 508 can also include an opening or hole 512 that is configured to receive a fastener for securing the post member 502a to the back panel 110 or to a wall bracket (not shown) external to the back panel 110. In one embodiment, the back panel 110 can include a corresponding opening (not shown) that is configured to align with the hole 512 and provide access for a fastener inserted from an other side of the back panel 110.

The post member 502a also includes one or more openings or holes 514, 516 and 518. In one embodiment, the holes 514, 516 and 518 can be used to secure the panels of the enclosure 100 to the post member 502a. For example, in one embodiment, a fastener (not shown) can be used to engage the panels and the holes 514, 516 and 518 to secure the panels to the corresponding post member 502a.

The holes 514 are formed in a portion of the post member 502a that faces the top panel 102, referred to as the exterior facing or base portion of the post member. For post member 502c, 502d, the holes 514 will face the bottom panel 104. Each hole 514 is configured to receive a corresponding fastener that allows the post 502a to be secured to or through the top panel 102, if desired. In one embodiment, the enclosure 100 of FIG. 1 can be secured to a base member (not shown), either at the top or bottom of the enclosure 100 using holes 514.

In the case of post members 502c and 502d, on a lower or bottom part of the enclosure 100, the hole(s) 514 provide for using a fastener to fasten each post member 502c, 502d to a base member (not shown), such as for example a floor base or platform. In one embodiment, the fastener can comprise a screw or bolt, for example.

The holes 516 and 518 are similarly configured to receive corresponding fasteners for securing the top and bottom panels, 102, 104, and side panels 106, 108, respectively, to a respective post member 502. The hole 516 in the post member 502a shown in FIG. 5B is used to secure the top panel 102 to the post 502a, while the hole 518 is used to secure the left side panel 106 to the post 502a.

FIGS. 6A-6C illustrate one example of the attachment of the top panel 102 to the post members 502a, 502b and back panel 110. For purposes of illustration, only the configuration and attachment of the top panel member 102 will be described herein. However, in one embodiment, the top and bottom panel members 102, 104 are substantially symmetrical in shape and configuration. The bottom panel member 104 can thus be similarly configured and attached to the corresponding post members 502c, 502d and back panel 110 in the fashion described herein with respect to top panel 102.

As shown in FIG. 6A, in one embodiment, the top panel member 102 is hung over each post member 502a, 502b. As shown in FIG. 6A, the top panel member 102 is moved in the directions X and Y to position the top panel member 102 over the post members 502a, 502b. One or more rib receiving members 604, along an edge of the panel member 102, receive a corresponding upstanding rib 606 of the back panel 110 as shown in FIG. 6B. The top panel member 102 can be moved in the direction Z as shown in FIG. 6B to engage rib receiving member 604 and rib 606. A more detailed example of the upstanding rib 606 is shown in FIG. 3A.

In one embodiment, the panel 102 is affixed to each post 502a, 502b by inserting a fastener (not shown) through opening 608 in the panel 102 and into the hole 516 of each post member 502a, 502b. Although only one opening 608 and hole 516 is shown in this example, in alternate embodiments, any suitable number of holes and fastener devices can be used.

FIGS. 7A-7C illustrate one embodiment of attaching the side panel 106 to the back panel 110 and post members 502a, 502c. For illustrative purposes, only the attachment of side panel 106 will be described. However, side panel 108 can be similarly configured and attached to the back panel 110 and respective corner post members 502b, 502d.

As shown in FIG. 7A, a side panel 106 is attached along each lateral side 710a, 710b of the back panel 110. Referring to FIG. 7B, the side panel 106 includes a rib receiving portion 704, or clip member, along one edge, that is configured to engage an upstanding rib member 706 along each lateral side or edge 710a, 710b of the back panel 110. As shown in FIG. 7A, the side panel 106 is moved in the direction D to engage the rib receiving portion 704 with the rib member 706.

In one embodiment, the side panel 106 also includes a flange member 708, one at each end of the panel 106, shown in FIG. 7C, that includes one or more openings 710. Each flange member 708 is configured to be positioned over an end of the post member 502a. For illustrative purposes only, only post member 502a will be described with respect to FIGS. 7A-7C. However, a similar process can be carried out with respect to post members 502b-502d. The opening 710 is aligned with hole 518 of the post member 502a to allow a fastener (not shown) to be inserted through the opening 710 and into the hole 518. The fastener can be used to secure the side panel 106 to the post member 502a. The same procedure occurs with respect to the bottom post member 502c. Each side panel 106, 108 is thus secured to a respective post member 502a-502d in each corner region of the enclosure 100.

Figure 8A:
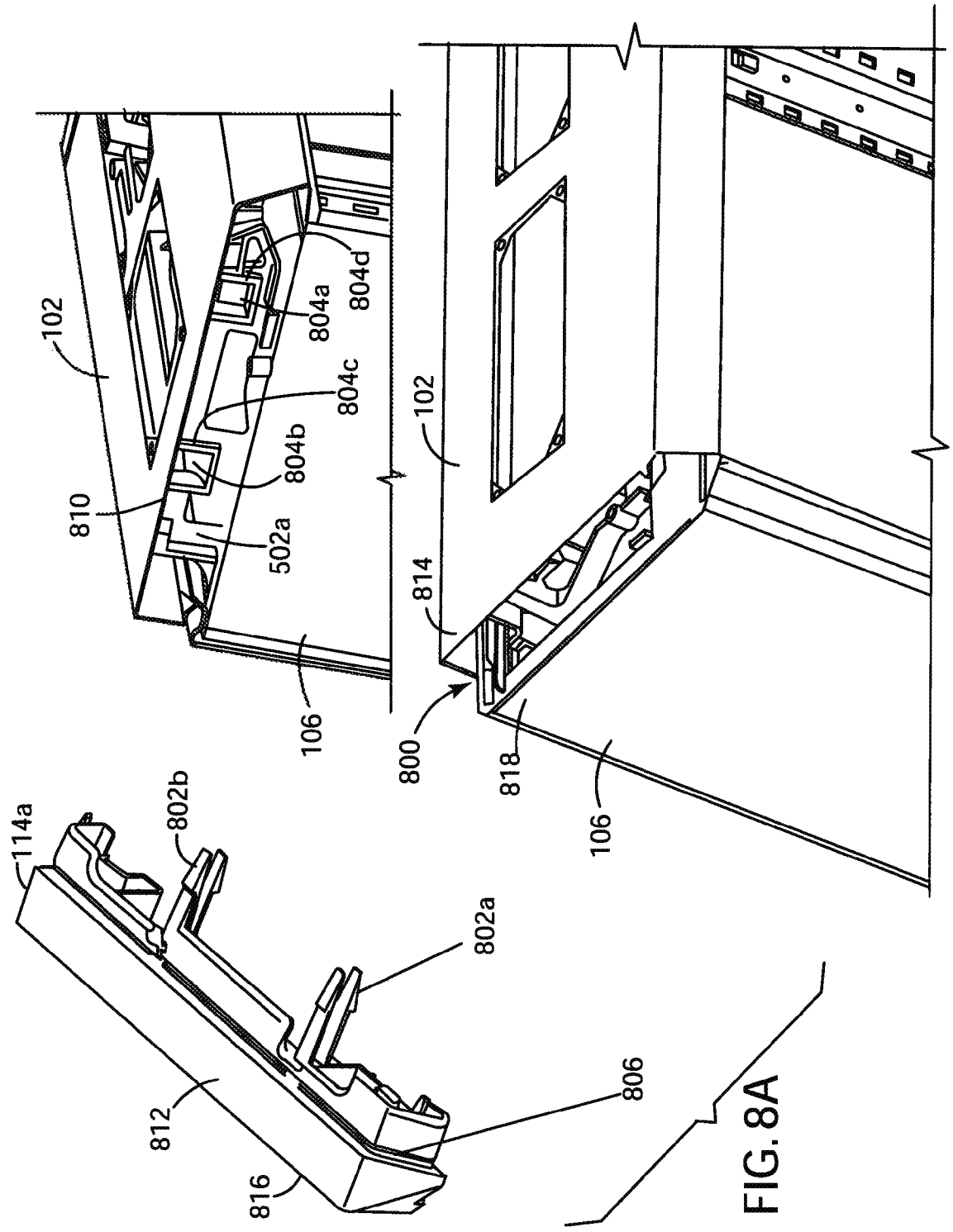

As shown in FIG. 8A, in one embodiment, once the top/bottom panels 102/104, and side panels 106, 108 are attached to the back panel 110 and a respective corner post 502a-502d, a gap 800 may remain between respective edges of each of the top/bottom 102/104 and side panels 106, 108. For illustrative purposes, only the gap 800 between the top panel 102 and the side panel 106 will be described herein. However, it will be understood that a similar gap may exist in each corner of the enclosure 100 between adjacent top/bottom 102/104 and side panels 106/108.

In one embodiment, in order to close the gap 800 between the respective panel members and maintain a substantially planar surface between respective panel members, a corner part 114a, 114b can be inserted into each gap 800, such as the gap 800 between the top panel 102 and side panel 106. The corner parts 114a, 114b will be suitably configured to be positioned in each of the four corners of the enclosure. For example, one corner part 114a can be used for the upper left and lower right corners of the enclosure, while another corner part 114b can be used for the upper right and lower left corners of the enclosure 100, as shown in FIG. 1. Corner parts 114a and 114b will be similarly configured with variations respective to the direction of insertion.

To close the opening or gap 800 that is formed between an end of the top panel 102 and an end of the adjacent side panel 106, corner part 114a is used. The corner part 114a generally comprises a plastic material, although in alternate embodiments, the corner part can comprise any suitable material. As shown in FIG. 8A, in one embodiment, the corner part 114a includes one or more retaining members 802a, 802b. The retaining members 802a and 802b are configured to be received in corresponding openings 804a, 804b in the corner post member 502a. In one embodiment, the retaining members 802a, 802b are snap hooks that, when inserted into the respective openings 804a, 804b, releasably engage a frame portion of the respective opening 804a, 804b. In alternate embodiments, the retaining members 802a, 802b can comprise any suitable device that releasably engages a fixed part, such as for example, a spring-loaded retaining device.

As shown in FIG. 8A, in one embodiment, the openings 804a, 804b are generally rectangular in shape. In alternate embodiments, the openings 804a, 804b can be any suitable shape that will allow the corresponding retaining members 802a, 802b to be releasably engaged in each opening.

In one embodiment, the corner part 114a also includes a grooved portion 806. The grooved portion 806 allows the corner part 114a to be seated substantially against an edge 810 of the top panel 102, with the upper body portion 812 of the corner part 114a configured to be substantially planar with an outer surface 814 of the top panel 102. Similarly, the side body portion 816 of the corner part 114a is configured to be substantially planar with the outer surface 818 of the side panel 106. A substantially smooth and level surface is formed from each panel 102,106 to the corner part 114a.

As illustrated in FIG. 8B, the corner part 114a is configured to be slidingly engaged with the top panel 102 and corner post 502 by moving the corner part 114a in the direction A shown in FIG. 8B. As the retaining members 802a, 802b enter the corresponding openings 804a, 804b, they releasably engage a respective frame portion 804c, 804d of each opening 804a, 804b. In the embodiment where the retaining members 802a, 802b are snap hooks, the snap hooks can be disengaged from an interior of the enclosure 100 in order to remove the corner part 114a. In alternate embodiments, the retaining members 802a, 802b can be disengaged in any suitable manner.

Figure 9A:
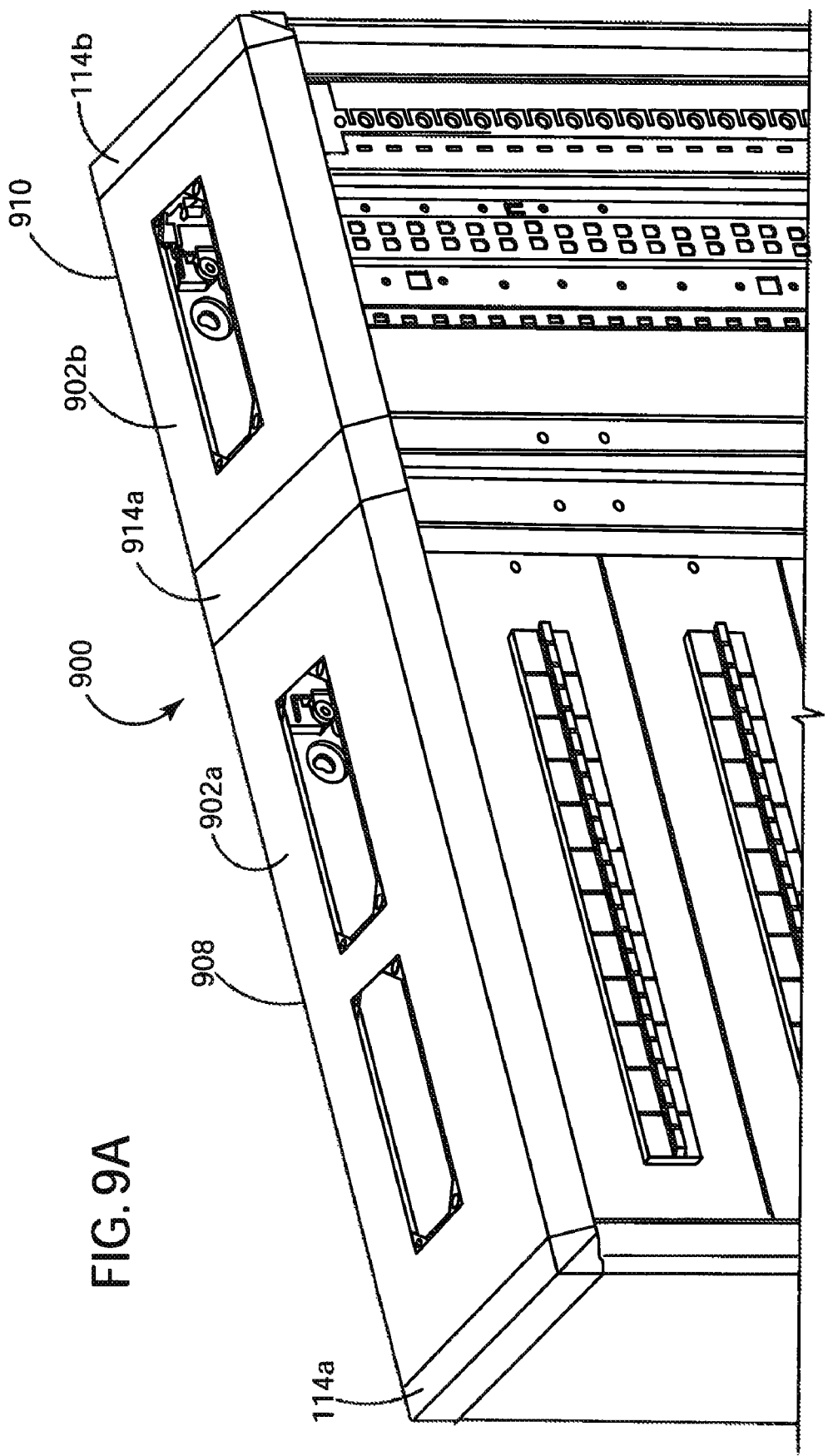

The aspects of the disclosed embodiments allow any number of enclosures, such as the enclosure 100 shown in FIG. 1, to be connected together in a horizontal direction, to form an expanded equipment enclosure. FIG. 9A illustrates one embodiment of an expanded equipment enclosure 900. The aspects of the disclosed embodiments allow for one enclosure part 908 to be secured to another enclosure part 910. In this way, a size of the enclosure 100 can be incrementally expanded. The size of each enclosure part, such as enclosure parts 908 and 910, can be varied in order to form any suitable sized enclosure 900.

Figure 9B:
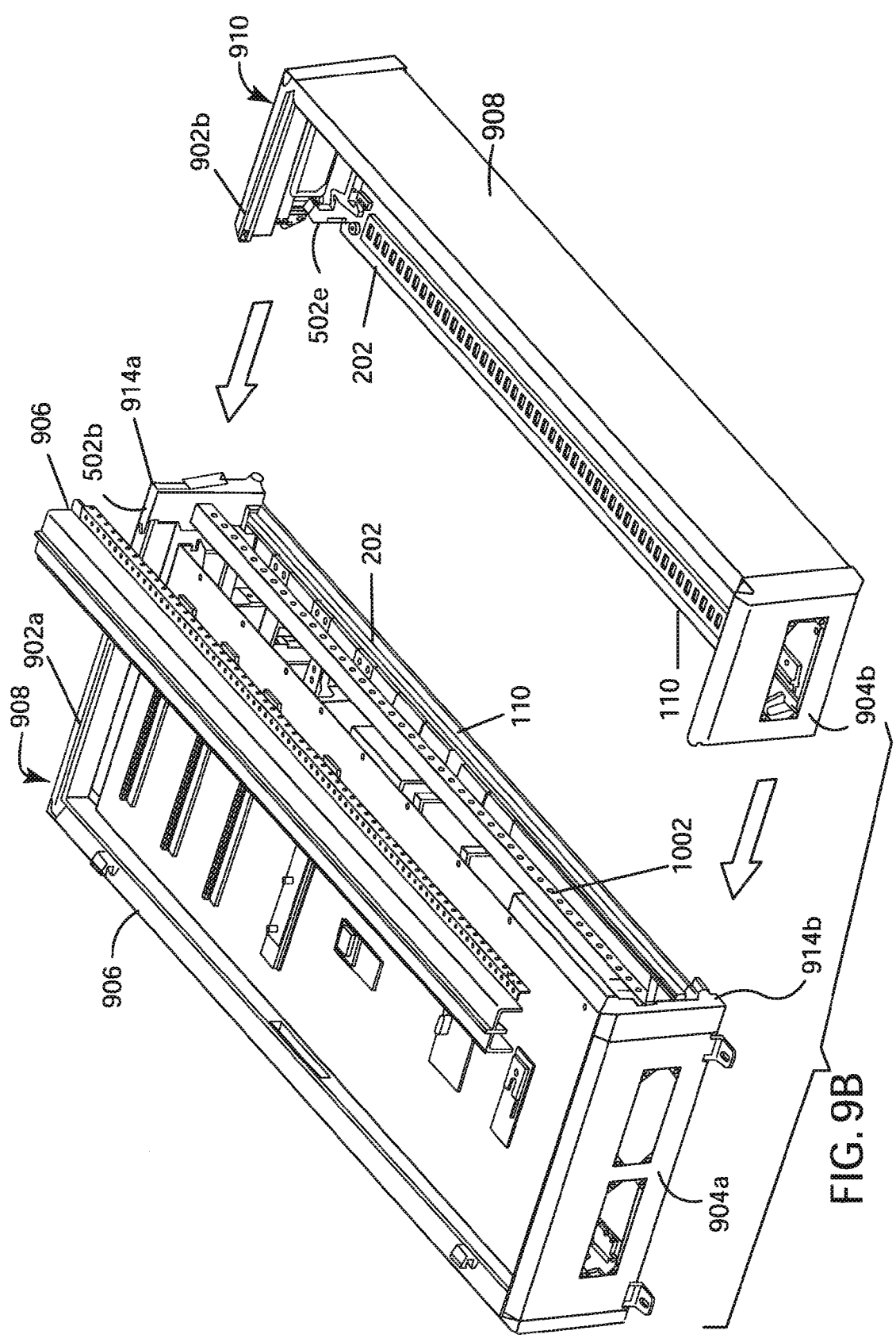

FIG. 9B illustrates one example of the assembly of enclosure parts 908 and 910 to form expanded enclosure part 900. Each enclosure part 908, 910 is formed as described herein, except that the panel member on the sides that are to be joined are omitted. For example, enclosure part 908 does not include a right side panel while the enclosure part 910 does not include a left side panel.

At the right side of each the top panel 902a and bottom panel 904a, a gap part 914a, 914b is inserted in place of respective corner parts 114a and 114b. The features of each gap part 914a, 914b are similar to those of the corner parts 114a, 114b described earlier, except that each side of the gap part 914a, 914b includes symmetrical features 802a, 802b and groove 806. Each gap part 914a, 914b can slidingly engage a respective pair of corner post members, such as 502b, 502e, as shown in FIG. 9B.

In one embodiment, a coupling member 906 can be used to mechanically join the enclosure 908 to enclosure 910. As shown in FIG. 9C, in one embodiment, the coupling member 906 is a substantially U-shaped member, comprising a rigid material, that includes at least one opening 1002 on either side. The openings 1002 are configured to align with a corresponding opening 1018 on a front end of each post member 502b, 502e. Similar openings exist at the other end of the coupling member 906. One or more fasteners (not shown) can be inserted through each opening 1002 to secure the coupling member 906 to the respective post member 502.

In one embodiment, the coupling member 906 includes a channel portion on its underside (not shown) to accommodate the upstanding rib member 202a or 202b, referred to with respect to FIG. 2. In alternate embodiments, the coupling member 906 can be suitably configured and shaped to be able to fit across and be secured to the respective post members 502 on each enclosure 908, 910. FIG. 9D illustrates one embodiment of the coupling member 906 secured to each of the corner post members 502b, 502d, prior to attachment of the top panels 902a, 902b and gap part 914a.

In addition to, or in place of the coupling member 906, in one embodiment, one or more of joining parts 1000 and 1001 can be used to secure the enclosures 908, 910 to each other, as shown in FIG. 9C. Joining part 1000 is configured to be secured to each corner post 502b, 502e by inserting a fastener through opening 1014 in each part 1000 and into a hole 514 in the respective post member 502.

Joining part 1001 is configured to be secured to a respective corner post 502 by securing a fastener through opening 1020 into hole 520 of the corresponding post member 502. As shown in FIG. 9B, in one embodiment, a substantially U-shaped member 1002 is placed over the upstanding ribs 202a and 202b shown in FIG. 2. Joining part 1001, which is similarly shaped, is placed over each end of the member 1002 and secured to the respective corner post members 502 as described above.

FIG. 9D illustrates the attachment of the coupling member 906 to post members 502b, 502e. Holes 516 and 518 in the respective post members 502b and 502e are used to fastening the coupling member 906 to the post members 502b, 502e. Similarly, at a bottom portion of the enclosure (not shown), the coupling member 906 can be secured to the bottom post members (not shown). The assembly also includes joining parts 1000, 1001 and member 1002. In this fashion, any suitable number of enclosures 100 can be joined together in a rigid and secure fashion.

Assembly of the expanded enclosure 900 can first comprise assembling and securing the top and bottom panels 902a, 902b, 904a, 904b, 906 and 908 to the respective corner posts 502. The gap parts 914a and 914b are added and the two enclosures 908 and 910 are slidingly engaged as shown in FIGS. 9B and 9C. The member 1002, and joining parts 1000, 1001 can be added and secured as shown in FIG. 9C. Coupling member 906 is then attached to complete the enclosure 900.

The assembly of the expanded enclosure can also comprise first mechanically coupling the enclosures 908, 910 together, and then adding the top and bottom panels. For example, referring to FIG. 9D, in one embodiment, the joining parts 1000, 1002 and coupling member 906 are attached as described above. The gap part 914a is added and each top panel 902a, 902b is positioned as shown in FIG. 9E and secured as described herein. In one embodiment, the top panel 902b is moved into position by sliding the top panel 902b in the direction C over the respective post members as shown in FIG. 9E. The bottom panels are similarly attached.

Figure 10:
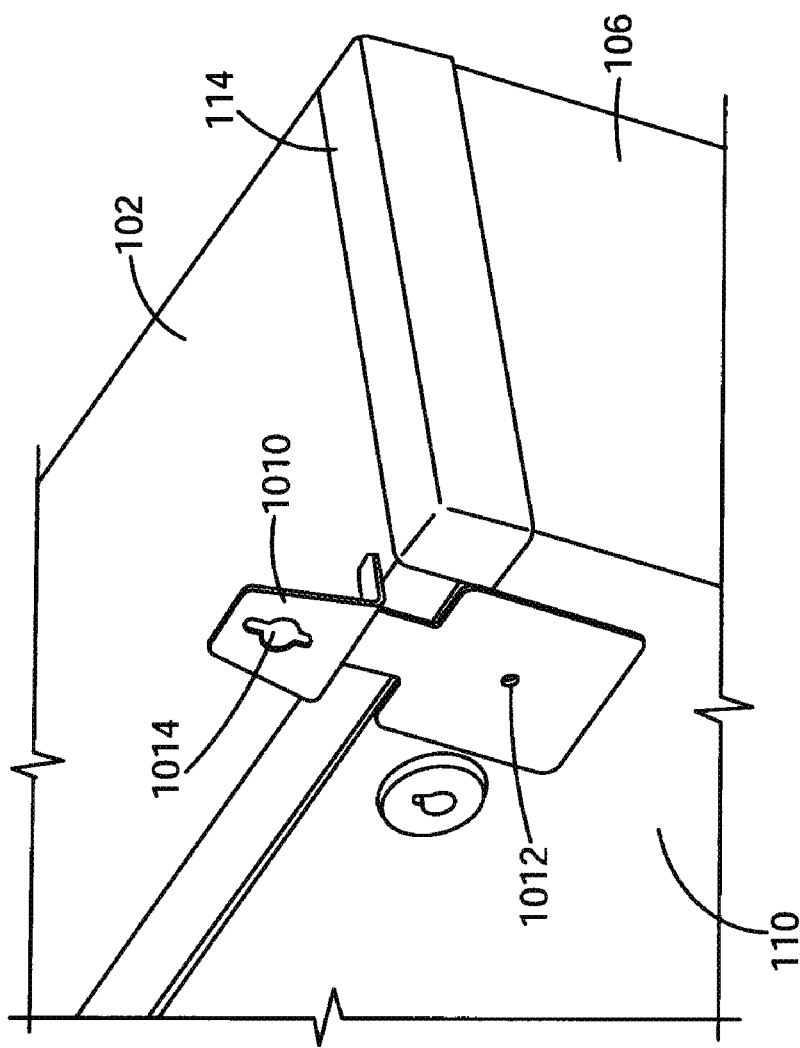
FIG. 10 illustrates one embodiment of a profile member attached to the enclosure of FIG. 1.

Referring to FIG. 10, in one embodiment one or more profile members 1010 can be used to reinforce the back panel 110. The profile member 1010 includes opening 1012 that allows a fastener (not shown) to be inserted through the opening 1012 and into hole 512 of center post 508 of post member 502 to secure the profile member 1010 to the post member 502. In one embodiment, the profile member 1010 allows the enclosure 100 to be secured to a wall by inserting a fastener 1114 through opening 1014 as shown in FIG. 11.

Figure 11:
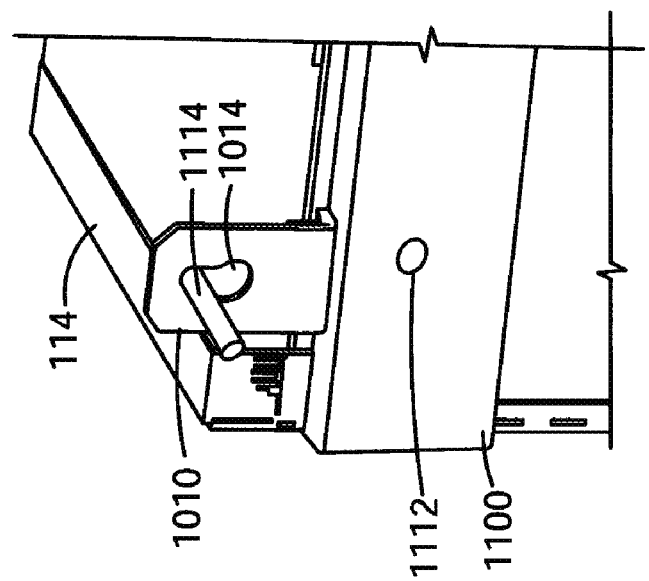
FIG. 11 illustrates one embodiment of a fixation bracket attached to the enclosure of FIG. 1.

As shown in FIG. 11, a fixation bracket 1100 can also be used to reinforce the back panel 110. The fixation bracket 1100 is configured to extend along a top and bottom edge region of the back panel 110 of enclosure 100. Each fixation bracket 1100 includes opening 1112 that is configured to align with the hole 512 in center post 508 of respective post member 502. Insertion of a fastener (not shown) into the opening 1112 can be used to secure the fixation bracket 1100 to the post member 502.

The aspects of the disclosed embodiments thus provide for an equipment enclosure that can be quickly and easily assembled without the need for specialized tools. The post members allow the top, bottom and side panels be easily and securely fastened together. The enclosure is expandable to any size and configuration.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A post member for securing a plurality of enclosure panels together, a first one of the panels including at least one alignment member, the post member comprising:
   a first end, a second end and a middle member coupling the first end and the second end, the first end comprising:
   a fixation hole configured to engage an alignment member of the first one of the enclosure panels;
   a centering pin configured to engage the first one of the enclosure panels; and
   a first upstanding fastener receiving member disposed on the first end on a plane above the centering pin and fixation hole, the first upstanding fastener receiving member comprising a fastener opening, the first upstanding fastener receiving member and being oriented substantially perpendicular to the fixation hole and centering pin, and the fastener opening being aligned vertically in the first upstanding, receiving member;
   the second end comprising at least one aperture configured for engagement with at least one other of the enclosure panels, the at least one aperture being aligned horizontally in the second end relative to the vertically aligned fastener opening in the first upstanding fastener receiving member and parallel with the fixation hole; and wherein the middle member is aligned vertically between the first end and the second end.

2. The post member of claim 1 further comprising at least one opening in the middle member between the first and the second end, a frame portion surrounding each opening.

3. The post member of claim 1, wherein the middle region comprises an upper side and a lower side, and the at least one other of the enclosure panels is a top panel member or a bottom panel member, the upper side of the middle region configured to be positioned adjacent to the top panel member or bottom panel member, the upper side including at least one opening.

4. The post member of claim 1 wherein the post member is a cast aluminum alloy.

5. The post member of claim 1 wherein the second end of the post member is configured to extend away from the first one of the enclosure panels along a substantially perpendicular plane, and a top or bottom panel and corresponding side panel of the at least one other of the enclosure panels are configured to be secured to the second end of the post member.

6. The post member of claim 1, the middle region comprises an upper arm member and a lower arm member, a substantially vertical arm member between the upper arm and the lower arm, the upper, lower and vertical arm members defining at least one snap fastener opening between the first end and the second end of the post member.

7. The post member of claim 1, wherein the second end comprises a second upstanding fastener receiving member aligned on a same plane relative to the first upstanding receiving member, the second upstanding fastener receiving member comprising a vertically aligned fastener opening.

8. The post member of claim 1, wherein a height of the middle member at the first end is greater than a height of the middle member at the second end.

9. A corner structure for an enclosure having a top panel, a bottom panel, side panels and a back panel with at least one rack rail member positioned thereon, comprising:
a post member;
a first end of the post member including at least one fixation hole, the at least one fixation hole configured to engage an alignment member located in a corner region of the back panel;
a centering pin on the first end of the post member, the centering pin being configured to engage the at least one rack rail member to secure the rack rail member to the back panel;
a second end of the post member including at least a pair of apertures, each aperture being configured to secure the top or bottom panel and corresponding side panel to the second end of the post member;
an upstanding fastener receiving member on each of the first end and the second end, each upstanding fastener receiving member having a pair of vertically aligned openings, each pair of vertically aligned openings on each end being symmetrically aligned on a same plane, each upstanding fastener receiving member being oriented perpendicularly relative to the centering pin on the first end, and wherein each aperture in the second end is aligned horizontally in the second end relative to the vertically aligned fastener opening in the upstanding fastener receiving members and parallel with the fixation hole; and
a middle member connecting the first end and the second end, the middle member being vertically aligned and comprising a horizontally aligned fastener opening extending therethrough.

10. The corner structure of claim 9 wherein a gap is formed between adjacent top or bottom panels and the corresponding side panel, and the corner structure further comprises a corner part configured to close the gap; a region of the post member between the first end and the second end including at least one opening, the opening configured to releasably engage the corner part.

11. The corner structure of claim 9 wherein the post member is a cast aluminum alloy.

12. The corner structure of claim 9, wherein the centering pin further comprises an aperture.

13. The corner structure of claim 9, wherein an exterior facing portion of the post member includes at least one hole.

14. The corner structure of claim 9 wherein the second end of the post member extends along a substantially perpendicular plane away from the back panel.

15. An enclosure for electrical equipment comprising:
a back panel, top and bottom panels, and a pair of side panels;
at least one rack rail member affixed to the back panel;
a post member in each corner of the enclosure, the post member configured to secure the back panel, top or bottom panel, and a respective side panel together, wherein each post member further comprises:
a centering pin at a first end of the post member configured to engage each rack rail member to secure each rack rail member to the back panel;
an upstanding fastener receiving member that includes at least one fastener opening disposed above the centering pin, the fastener opening being aligned vertically in the upstanding fastener receiving member and oriented substantially perpendicularly to the at least one fixation hole and centering pin for securing one of the top or bottom panel to the post member; and
a second end that includes a pair of holes aligned horizontally in the second end relative to the vertically aligned fastener opening in the upstanding fastener receiving member and parallel with the centering pin, each hole in the second end being configured to secure the top or bottom panel and respective side panel to the post member.

16. The enclosure of claim 15, further comprising at least one alignment member in each corner region of the back panel, and at least one fixation hole in the first end of the post member, wherein , each alignment member is configured to be received in one of the at least one fixation hole.

17. The enclosure of claim 15, further comprising at least one upstanding rib member on the back panel, a corresponding rib receiving member on each of the top and bottom panel, each upstanding rib member being configured to engage the corresponding rib receiving member.

18. The enclosure of claim 15 further comprising a rib member along each lateral side of the back panel, a corresponding rib receiving member on each side panel, each rib member configured to engage the corresponding one of the rib receiving member.

19. The enclosure of claim 15, wherein a gap is formed at each corner between ends of adjacent ones of the top, bottom and side panels, wherein a corner part is configured to occupy each gap, the corner part comprising at least one retaining member configured to releasably engage the corner part with the post member.

20. The enclosure of claim 15, wherein the enclosure comprises at least a first enclosure part and at least a second enclosure part, each of the first and second enclosure part having a top, bottom and back panel, a post member in each corner of each of the first and second enclosure part, the enclosure further comprising a joining part for coupling the first enclosure part to the second enclosure part along adjacent sides of the first and second enclosure part, wherein an upper and a lower end of the joining part align with the post member in each corner of the adjacent sides of the first and second enclosure part, the joining part including at least one opening on the upper and lower end that is configured to alien with an opening in each post member for securing the joining part to each post member.

21. The enclosure of claim 15 wherein the enclosure comprises a first enclosure part and at least one second enclosure part joined together along adjacent sides of the first and at least one second enclosure part; each of the first enclosure part and at least one second enclosure part having a top panel, a bottom panel and a back panel; a post member in each corner of the adjacent sides of the first and second enclosure part; a front facing end of the post member in each corner along the adjacent sides of the first and second enclosure part having at least one opening; and a joining member extending along the adjacent sides of the first and second enclosure part, the joining member configured to be secured to the front facing end of the post member in each corner.

22. The enclosure of claim 15, further comprising a base portion between the first end and the second end of each post member, and at least one fixation hole in the base portion.

\* \* \* \* \*

UNITED STATES PATENT AND TRADEMARK OFFICE
CERTIFICATE OF CORRECTION

PATENT NO. : 8,282,174 B2
APPLICATION NO. : 12/425848
DATED : October 9, 2012
INVENTOR(S) : De Cuyper et al.

It is certified that error appears in the above-identified patent and that said Letters Patent is hereby corrected as shown below:

In Column 2, Line 19, delete "4A-4D" and insert -- 4A-4D is --, therefor.

In Column 2, Line 31, delete "together." and insert -- together; --, therefor.

In Column 4, Lines 26-27, delete "an other" and insert -- another --, therefor.

In Column 8, Line 64, in Claim 1, delete "upstanding," and insert -- upstanding --, therefor.

In Column 10, Line 50, in Claim 16, delete "wherein ," and insert -- wherein, --, therefor.

In Column 11, Line 12, in Claim 20, delete "alien" and insert -- align --, therefor.

Signed and Sealed this
Ninth Day of April, 2013

Teresa Stanek Rea
*Acting Director of the United States Patent and Trademark Office*